United States Patent
Houminer

(10) Patent No.: US 12,499,403 B2
(45) Date of Patent: Dec. 16, 2025

(54) SYSTEMS AND METHODS FOR PROVIDING INSIGHT REGARDING RETAIL STORE PERFORMANCE AND STORE LAYOUT

(71) Applicant: Arye Houminer, Raanana (IL)

(72) Inventor: Arye Houminer, Raanana (IL)

( * ) Notice: Subject to any disclaimer, the term of this patent is extended or adjusted under 35 U.S.C. 154(b) by 0 days.

(21) Appl. No.: 17/992,980

(22) Filed: Nov. 23, 2022

(65) Prior Publication Data

US 2023/0162122 A1 May 25, 2023

Related U.S. Application Data

(60) Provisional application No. 63/283,230, filed on Nov. 25, 2021.

(51) Int. Cl.
| | |
|---|---|
| *G06Q 10/08* | (2024.01) |
| *G06Q 10/0639* | (2023.01) |
| *G06Q 10/087* | (2023.01) |
| *G06V 20/52* | (2022.01) |

(52) U.S. Cl.
CPC ..... *G06Q 10/06393* (2013.01); *G06Q 10/087* (2013.01); *G06V 20/52* (2022.01)

(58) Field of Classification Search
None
See application file for complete search history.

(56) References Cited

U.S. PATENT DOCUMENTS

| | | | |
|---|---|---|---|
| 11,948,110 B2* | 4/2024 | Hoang | G06F 16/784 |
| 2010/0065632 A1* | 3/2010 | Babcock | G06Q 10/087 |
| | | | 705/28 |
| 2014/0095969 A1* | 4/2014 | Shneider | G06Q 10/06 |
| | | | 715/224 |
| 2014/0156405 A1* | 6/2014 | Ganz | A63F 13/12 |
| | | | 705/14.55 |
| 2020/0034781 A1* | 1/2020 | Sewak | G06Q 10/067 |
| 2020/0065570 A1* | 2/2020 | Marcheselli | G07C 9/00 |
| 2021/0004756 A1* | 1/2021 | Kulkarni Wadhonkar | |
| | | | G06V 20/52 |

* cited by examiner

*Primary Examiner* — Alan Torrico-Lopez
(74) *Attorney, Agent, or Firm* — Gearhart Law LLC

(57) ABSTRACT

A system and method for providing insights regarding retail store performance and/or store layout are described herein. One or more cameras in a store capture and transmit data associated with product inventory, equipment inventory, patrons, and employees in the store to a computing device. The computing device queries a repository to determine identifiable information associated with each of the product inventory, the equipment inventory, the patrons, and the employees. The data is combined with the identifiable information to form a data set. An artificial intelligence (AI) algorithm is applied to the data set to determine a conclusion regarding a performance and/or layout of the store. The data, the data set, and the conclusion are stored the repository. A representation of the conclusion is generated and presented via a graphical user interface (GUI) of the computing device to a user. The representation is a store-specific planogram.

19 Claims, 10 Drawing Sheets

HOME / Products

| Barcode ◇ | Product Name ◇ | Source ◇ |
|---|---|---|
| 7290000355757 | Tal and Terry regular crushed tomatoes | direct |
| 7290112498861 | — | gs1 |
| 7290112190468 | .Olive oil extra virgin 750ml - GFOOD | gs1 |
| 6111251700121 | 4X FILE ANSHOBI | direct |
| 6111049003113 | Sepia Spicy Sardines 4X | direct |
| 7290100412343 | Multi-purpose wet wipes for general thorough cleaning 50 | gs1 |
| 1325465892 | Almond Breeze Milk Box | direct |
| 7290017842257 | anshobi shave | direct |

Showing 1 to 8 of 622 results

[Search product] [SOURCE ALL ◇] [Search] [Add New]

SYSTEMS AND METHODS FOR PROVIDING INSIGHT REGARDING RETAIL STORE PERFORMANCE AND STORE LAYOUT

CROSS-REFERENCE TO RELATED APPLICATIONS SECTION

This application claims priority to U.S. Provisional Patent Application No. 63/283,230 filed on Nov. 23, 2021, which is incorporated by reference for all purposes as if fully set forth herein.

FIELD OF THE EMBODIMENTS

The field of the invention and its embodiments relate to a system and a method for providing insight regarding retail store performance and store layout. More specifically, the field of the invention and its embodiments relate to a system and a method that uses artificial intelligence (AI) and planograms to provide insight regarding retail store performance and store layout.

BACKGROUND OF THE EMBODIMENTS

Retail is the process of selling goods or services to customers through multiple channels of distribution to earn a profit. Retailers satisfy demand identified through a supply chain. Total retail sales in the United States are projected to amount to 5.94 trillion U.S. dollars in 2024, up from around 5.47 trillion U.S. dollars in 2019. However, one of the major problems in the retail space is the ability to make data-based decisions from the field, analyze them, and verify execution of these decisions. Factors such as the volume of activity, the large quantity of employees, products, and customers, marketing, sales, logistics, and operations make it difficult to reach and address every point in the field. Thus, what is needed is a system that provides insight regarding retail store performance and store layout.

Review of Related Art

U.S. Published Patent Application No. 2019/0311470 A1 describes an apparel production monitoring system using image recognition. The apparel production monitoring system includes: a first camera module that takes an image of apparel products and a monitoring device that analyzes the image of the apparel products to grasp the number and sizes of the apparel products, receives a transmission image of the apparel products, and compares and analyzes it with a previously learned transmission image to detect a defect of the apparel products.

KR101850286B1 provides a deep learning-based image recognition method for CCTV. The method comprises the steps of: (a) allowing an image recording unit to photograph and record an object to be controlled by using a built-in camera and to output recording data on shape information and movement information; (b) allowing a background extracting unit to receive the recording data, separate and extract an image of the object to be controlled from a background image within a current frame through the shape of the photographed object to be controlled and to output the extracted data; (c) allowing an image analyzing unit to receive the extracted data, analyze a differential image between the current frame and a next frame, extract a spatial feature of the object to be controlled, and generate a vector space to output context data, feature data, and face data; and (d) allowing a feature vector calculating unit to receive the context data, the feature data, and the face data and to compare the received data with a prestored pattern by using a deep learning technique to calculate a feature vector of the object to be controlled. The feature vector calculated from each of the plurality of CCTVs is transmitted to another CCTV connected in a machine-to-machine manner, thereby integrally tracking and monitoring the object to be controlled through an intelligent connection.

KR101625460B1 describes an integrated CCTV management system. The integrated CCTV management system is characterized by setting up the installation and management information of a CCTV system as a CCTV electronic map database and having a more efficient CCTV management and monitoring system by virtue of the linkage therewith.

EP1189187B1 describes a surveillance method. The method evaluates images from at least two image recording devices covering respective zones of the surveillance area, corresponding to critical and non-critical regions, separated from one another via an alarm boundary. The data relating to a detected position variation of an object in the zone covered by the first image recording device is supplied to the second image recording device.

U.S. Published Patent Application No. 2013/0235206 A1 describes an inventory management system that includes two or more cameras mounted on a retail display space. The cameras are positioned to capture images showing the presence of items of interest in the retail display space. A hub is in communication with each of the cameras mounted on the retail display space and is operable to aggregate information from the cameras related to the items of interest in the retail display space, and to communicate data regarding the status of the item of interest to an inventory management system operable to receive the data from the hub.

KR101049976B1 describes a method for preventing physical loss and checking delivery of products using a CCTV.

U.S. Pat. No. 6,850,265 B1 describes a video processing system that tracks a moving person or other object of interest using a combined audio-video tracking system. The audio-video tracking system comprises: an audio locator, a video locator, and a set of rules for determining the manner in which settings of a camera are adjusted based on outputs of the audio locator and video locator. The set of rules may be configured such that only the audio locator output is used to adjust the camera settings if the audio locator and video locator outputs are not sufficiently close and a confidence indicator generated by the audio locator is above a specified threshold. For example, in such a situation, the audio locator output alone may be used to direct the camera to a new speaker in a video conference. If the audio locator and video locator outputs are sufficiently close, the system determines if a confidence indicator generated by the video locator is above a specified level, and if so, the video locator output may be used to adjust the camera settings. For example, the camera may be zoomed in such that the face of a video conference participant is centered in and occupies a designated portion of a video frame generated by the camera.

Some similar systems exist. However, their means of operation are substantially different from the present disclosure, as the other inventions fail to solve all the problems taught by the present disclosure.

SUMMARY OF THE EMBODIMENTS

The present invention and its embodiments relate to a system and method for providing insight regarding retail store performance and store layout. More specifically, the present invention and its embodiments relate to a system and method that uses AI and planograms to provide insight regarding retail store performance and store layout.

A first embodiment of the present invention describes a method executed by an application of a computing device to provide insights regarding retail store performance and/or store layout. The method includes: receiving, from one or more sensors (e.g., cameras) in a store, data associated with product inventory, equipment inventory, patrons, and employees in the store. The data associated with the product inventory, the equipment inventory, the patrons, and the employees in the store includes a location and a quantity of each product of the product inventory, each piece of equipment of the equipment inventory, each patron of the patrons, and each employee of the employees. The method also includes querying a repository to determine identifiable information associated with each of the product inventory, the equipment inventory, the patrons, and the employees. Next, the method includes: combining the data with the identifiable information to form a data set.

The method further includes: applying an algorithm (e.g., an artificial intelligence (AI) algorithm) to the data set for to determine a conclusion regarding a performance and/or layout of the store. In examples, the conclusion includes: a quantity of missing products, a quantity of missing equipment, a quantity of the patrons in the store, a quantity of the patrons in the store per hour, a quantity of the patrons in each zone of the store, a quantity of the patrons in each zone of the store per hour, a quantity of the employees in the store, a quantity of the employees in the store per hour, a quantity of the employees in each zone of the store, a quantity of the employees in each zone of the store per hour, and/or an engagement rate per hour, among other information not explicitly listed herein. The data, the data set, and the conclusion is stored in the repository. A representation of the conclusion is generated and presented via a graphical user interface (GUI) of the computing device to a user. In preferred examples, the representation is a store-specific planogram.

The method further includes: receiving login credentials from a user to access a website associated with the store; and querying the repository to determine an identity of the user and an access level to the website for the user. The user is a manager of the store, an administrator of the store, or a department sorter of the store. The access level is a first access level or a second access level. The second access level is greater than the first access level. Further, the second access level provides the user a larger number of actions with respect to the website as compared to the first access level. In examples, the second access level allows the user to provide feedback.

A second embodiment of the present invention describes a system for providing insights regarding retail store performance and/or store layout. The system includes a store, a repository, and a computing device. The store includes one or more sensors (e.g., cameras) that are configured to capture data associated with product inventory, equipment inventory, patrons, and employees in the store. The data associated with the product inventory, the equipment inventory, the patrons, and the employees in the store includes a location and a quantity of each product of the product inventory, each piece of equipment of the equipment inventory, each patron of the patrons, and each employee of the employees. The repository is configured to store the captured data from the one or more sensors and identifiable information associated with each of the product inventory, the equipment inventory, the patrons, and the employees.

The computing device includes a graphical user interface (GUI) and an application. The application is configured to: receive the data associated with the product inventory, the equipment inventory, the patrons, and the employees in the store from the one or more sensors and combine the captured data with the identifiable information; and apply an artificial intelligence (AI) algorithm to the data set to determine a conclusion regarding a performance and/or a layout of the store. The conclusion includes: a quantity of missing products, a quantity of missing equipment, a quantity of the patrons in the store, a quantity of the patrons in the store per hour, a quantity of the patrons in each zone of the store, a quantity of the patrons in each zone of the store per hour, a quantity of the employees in the store, a quantity of the employees in the store per hour, a quantity of the employees in each zone of the store, a quantity of the employees in each zone of the store per hour, and/or an engagement rate per hour, among others not explicitly listed herein. The application is further configured to: transmit the conclusion to the repository for storage; and present a representation of the conclusion to a user. In preferred examples, the representation comprises a store-based planogram.

In some examples, the computing device is further configured to: receive login credentials from the user to access a website associated with the store and query the repository to determine an identity of the user and an access level to the website for the user. The user is a manager of the store, an administrator of the store, or a department sorter of the store. The access level is a first access level or a second access level. The second access level is greater than the first access level. Additionally, the second access level provides the user a larger number of actions with respect to the website as compared to the first access level.

In other examples, the application further comprises a planogram management tool integrated into a sales floor of the store that allows the user to analyze and verify the store-based planogram. In some examples, the application further comprises a queue monitoring system that is configured to detect an extension of queues and alert an expected extension of a queue.

A third embodiment of the present invention describes a computer system. The computer system includes one or more processors, one or more memories, and one or more computer-readable hardware storage devices. The one or more computer-readable hardware storage devices contain program code executable by the one or more processors via the one or more memories to implement a method to provide insights regarding retail store performance and/or store layout. The method includes: receiving, from one or more cameras in a store, data associated with product inventory, equipment inventory, patrons, and employees in the store. The data associated with the product inventory, the equipment inventory, the patrons, and the employees in the store includes a location and a quantity of each product of the product inventory, each piece of equipment of the equipment inventory, each patron of the patrons, and each employee of the employees.

Further, the method includes: querying a repository to determine identifiable information associated with each of the product inventory, the equipment inventory, the patrons, and the employees and combining the data with the identifiable information to form a data set. The method also includes applying an artificial intelligence (AI) algorithm to the data set to determine a conclusion regarding a performance and/or layout of the store. The conclusion is a quantity of missing products, a quantity of missing equipment, a quantity of the patrons in the store, a quantity of the patrons in the store per hour, a quantity of the patrons in each zone of the store, a quantity of the patrons in each zone of the store per hour, a quantity of the employees in the store, a quantity of the employees in the store per hour, a quantity of the employees in each zone of the store, a quantity of the employees in each zone of the store per hour, and/or an engagement rate per hour, among others. The method additionally includes storing the data, the data set, and the conclusion in the repository and presenting a representation of the conclusion via a graphical user interface (GUI) to a user. The representation is a store-specific planogram.

BRIEF DESCRIPTION OF THE DRAWINGS

FIG. 3 depicts an image of product data viewable via a website of a system, according to at least some embodiments disclosed herein.

DESCRIPTION OF THE PREFERRED EMBODIMENTS

Figure 1:
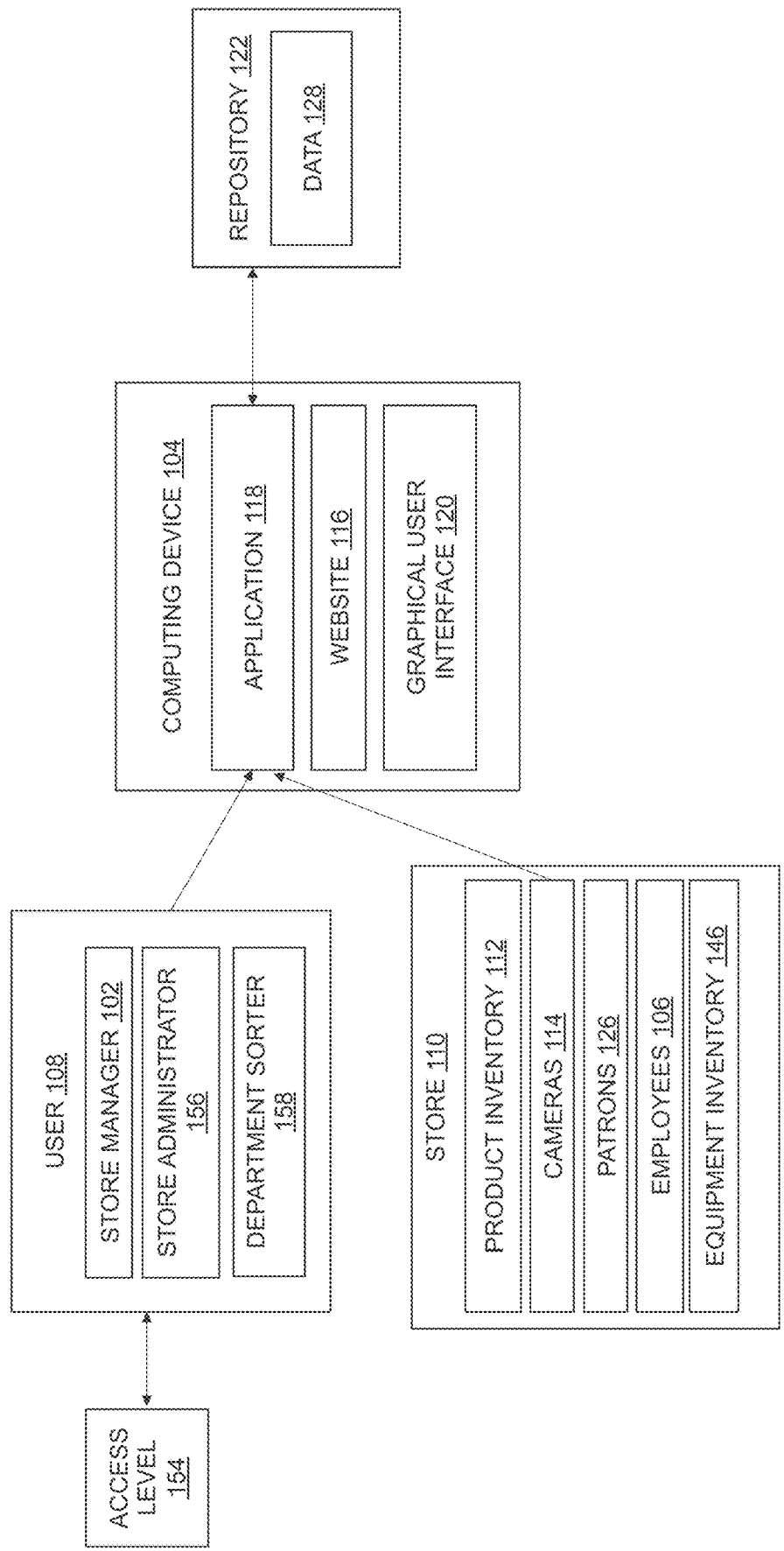
FIG. 1 depicts a block diagram of a system, according to at least some embodiments disclosed herein.

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

A system and method for providing insight regarding retail store performance and store layout are described herein. More specifically, the present invention describes a system and method that uses artificial intelligence (AI) and planograms to provide insight regarding retail store performance and store layout. The system described herein includes an AI-based platform built as a unified toolkit that incorporates management tools needed by store headquarters and sales floors. The platform assists in the collecting, analyzing, and verifying of a planogram and takes care of monitoring queues, monitoring analytics, and analyzing customer behavior. This solution provides an intuitive way for a business to work proactively.

Further, the system provides store executives the ability to better manage their sales floor in order to maximize their revenue and prevent loss in each category on the sales floor. The system achieves these goals by tracking patron/customer journeys through the store and tracking employees behavior through zones and departments in the store. In some examples, this system is integrated in a point-of-sale (POS) in the store and analyzes the data according to both patron journey and POS results. It should be appreciated that, as described herein, the POS is the time and place where a retail transaction is completed. At the point of sale (POS), the merchant calculates the amount owed by the customer, indicates that amount, may prepare an invoice for the customer, and indicates the options for the customer to make payment. Such system is depicted in at least FIG. 1 and FIG. 2.

As shown in FIG. 1, the system of the present invention includes, at least, a store 110, a repository 122, and a computing device 104. One or more sensors (e.g., one or more cameras) 114 may be positioned around the store 110 that are configured to capture data 128 associated with product inventory 112, equipment inventory 146, patrons or customers 126, and employees 106 in the store 110. In examples, the data 128 associated with the product inventory 112, the equipment inventory 146, the patrons or customers 126, and the employees 106 in the store 110 includes: a location and a quantity for each product of the product inventory 112, for each piece of equipment of the equipment inventory 146, for each of the patrons 126, and/or for each employee of the employees 106 in the store 110, among other information not explicitly listed herein. It should be appreciated that the equipment inventory 146 in the store 110 may include items such as, but not limited to, carts, grocery shopping baskets, produce containers, merchandiser stands, and/or merchandise racks.

It should be appreciated that the store 110 (e.g., retail establishment) may be divided into zones in any way the retailer chooses and the store 110 may have any quantity of zones. As an example, the store 110 may be divided via a grid layout, a loop layout, or a free flow layout. The grid layout is commonly used in supermarkets, drug stores, and many big box retail stores when stores carry a lot of products (particularly different kinds of products), or when a retail location needs to maximize space. The loop layout may be used if the store 110 is selling a product that people want to browse, touch and look at. The free flow layout can be any shape the retailer chooses.

Furthermore, the store 110 may have any quantity of departments that the retailer chooses and the departments may be organized in any way. As an illustrative example, a grocery store commonly includes the following departments: a produce department, a meat department, a seafood department, an alcoholic department, a health department, a deli department, a front end department, a bakery department, etc.

In some examples, the one or more sensors (e.g., one or more cameras) 114 described herein are single-camera multi-person detection and tracking cameras that do not detect the patrons/shopper's journey, but rather, monitor each zone of the store 110 separately. It should be appreciated that this tracking by the one or more sensors (e.g., one or more cameras) 114 may be accomplished by any method, such as the method described in U.S. Pat. No. 6,850,265 B1, which is incorporated by reference in its entirety. The one or more sensors (e.g., one or more cameras) 114 may also be used to capture images and detect theft of products. Furthermore, the one or more sensors (e.g., one or more cameras) 114 may also be used to ensure proper coverage of floor workers.

The repository 122 is configured to store the captured data 128 from the one or more sensors or cameras 114 and identifiable information associated with each product of the product inventory 112, each piece of equipment of the equipment inventory 146, each patron of the patrons or customers 126, and each employee of the employees 106. The identifiable information may include any other information that has not been captured from the sales floor of the store 110, such as information input by administrators of the store 110.

Figure 2:
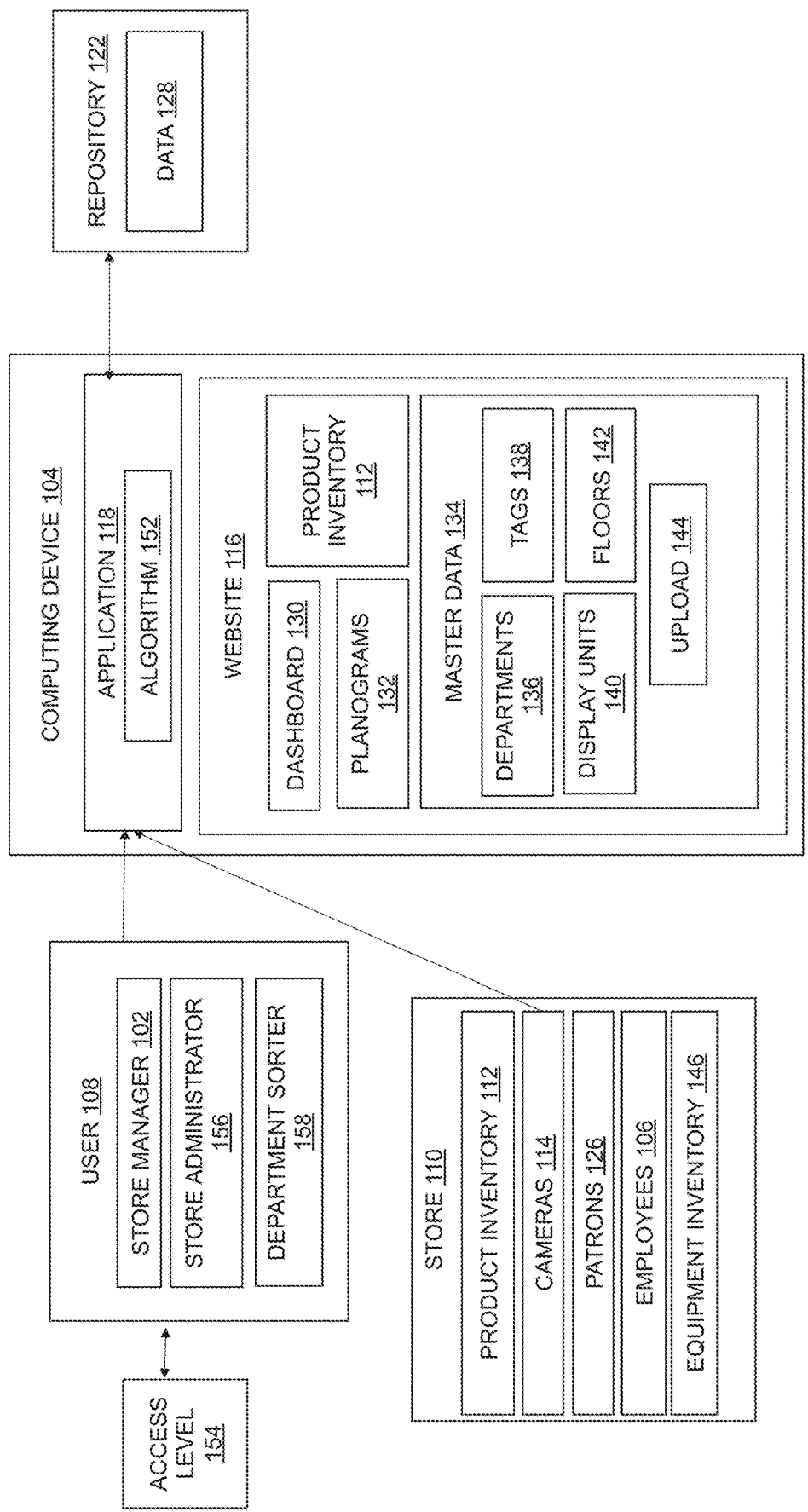
FIG. 2 depicts another block diagram of a system, according to at least some embodiments disclosed herein.

The computing device 104 of FIG. 1 and FIG. 2 may be a computer, a laptop computer, a smartphone, and/or a tablet, among other examples not explicitly listed herein. The computing device 104 includes, at least, a graphical user interface (GUI) 120 and an application 118. It should be appreciated that in some examples, the application 118 may be an engine, a software program, a service, or a software platform executable on the computing device 104. In other implementations, the computing device 104 may be replaced by a server such that the actions performed by the application 118 are performed by the server. Such structure enhances the security of the information and the data 128 discussed herein.

The application 118 of the computing device 104 is configured to: receive the data 128 associated with the product inventory 112, the equipment inventory 146, the patrons or customers 126, and the employees 106 in the store 110 from the one or more sensors or cameras 114. The application 118 may then pixel-label the patrons 126 and the employees 106 in the store 110 for tracking purposes. However, it should be appreciated that this is not the only way to track the patrons 126 and the employees 106 in the store 110. Next, the application 118 is further configured to combine the data 128 associated with the product inventory 112, the equipment inventory 146, the patrons or customers 126, and the employees 106 in the store 110 with the identifiable information queried from the repository 122 to form a data set.

The application 118 of the computing device 104 is further configured to: apply an algorithm 152 (of FIG. 2) to the data set for each of the product inventory 112, the equipment inventory 146, the patrons or customers 126, and the employees 106 to determine a conclusion regarding a performance or layout of the store 110. In examples, the algorithm 152 comprises an artificial intelligence (AI) algorithm. However, it should be appreciated that the algorithm 152 is not limited to such. Moreover, the application 118 of the computing device 104 is further configured to: transmit the conclusion to the repository 122 for storage.

In examples, the conclusion includes: a quantity of missing products from the product inventory 112, a quantity of missing equipment from the equipment inventory 146, a quantity of the patrons 126 in the store 110, a quantity of the patrons 126 in the store 110 per hour, a quantity of the patrons 126 in each zone of the store 110, a quantity of the patrons 126 in each zone of the store 110 per hour, a quantity of the employees 106 in the store 110, a quantity of the employees 106 in the store 110 per hour, a quantity of the employees 106 in each zone of the store 110, a quantity of the employees 106 in each zone of the store 110 per hour, and/or an engagement rate per hour, among others not explicitly listed herein. The engagement rate per hour, as described herein, includes a count of unique persons who stopped in a specific zone of the store 110 and engaged with the products per zone per hour. For simplicity, non-engaged persons are persons who kept walking straight without stopping in the specific zone area of the store 110. Thus, the present invention provides a tool for analyzing customer traffic at the store level.

Figure 4:
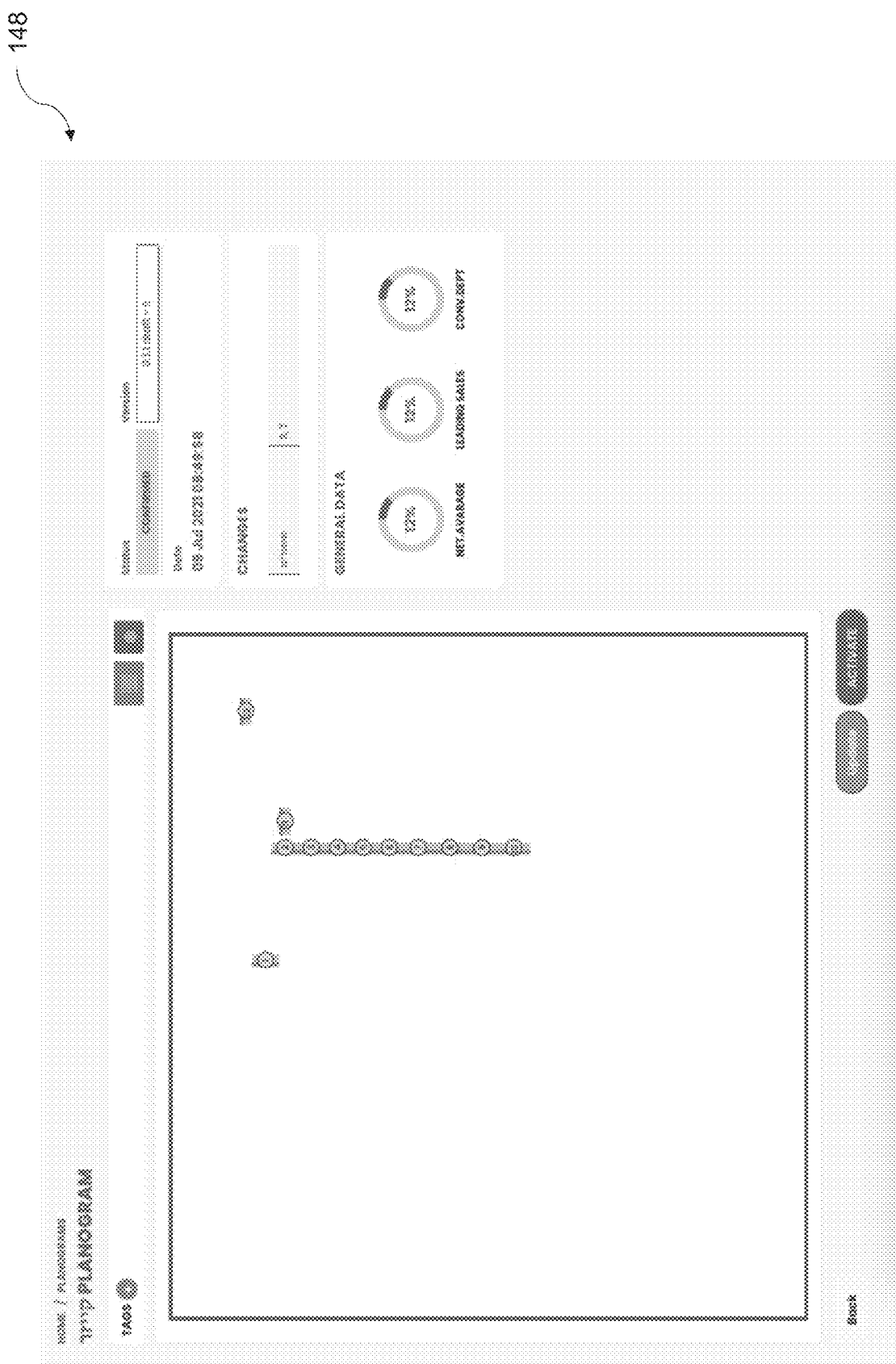
FIG. 4 depicts an image of a planogram viewable via a website of a system, according to at least some embodiments disclosed herein.

In other examples, the GUI 120 of the computing device 104 is configured to: present a representation of the conclusion to the user 108. The representation includes: a graphical representation, a textual representation, an audio representation, and/or an interactive representation. In some examples, the representation is a planogram 148, as shown in FIG. 4.

As described herein, the retail industry uses a process called planogramming for creating and communicating the design of a merchandise layout within a given category to be replicated at multiple retail locations. Typically created by corporate management or other centralized decision-makers, the planogram 148 is an illustration, drawing, or instructions showing where products should be placed on pegboard or other display background surfaces. It also details what fixtures, shelves, hooks, or other product display holding equivalents are used for displaying these products.

Retailers use planogramming to direct and influence consumers' purchases by creating merchandise displays that are well organized and visually appealing. The goal of planogramming is to increase sales and profits. Planogramming both improves the customer's shopping experience and influences customer behavior to encourage trade-up and impulse purchases. For retail corporate management, the planogram 148 is utilized as an information conveyance tool with the goal of ensuring that merchandise in their retail locations is set for display exactly as planned at the corporate headquarters. For the employees 106 in these retail locations, the planogram 148 is used as a specific instruction for setting up the merchandise displays.

Planogramming is one of the more costly payroll functions in retail. In current practice, once the planogram 148 is approved by management, a bar code is attached to each merchandise item displayed. These bar codes are then scanned using a hand held bar code reader to record the merchandise in the planogram 148. Next, peg holes are counted to establish the placement of fixtures and merchandise within the display pegboard and reflected in the planogram 148. This information is detailed in a paper document of the planogram 148, which is then distributed to stores for implementation. Store employees use the paper planogram document to physically set the merchandise display. These merchandise displays are typically set when stores are closed, by hourly employees working late into the night, using methods that typically involve manually counting peg holes to determine fixture and merchandise placement, in an effort to recreate the planogram layout determined by corporate. Thus, display setting using traditional paper planograms is time-consuming and costly.

Distinctly, the planogram 148 of the instant invention assists in determining the most desirable way to arrange the products of the product inventory 112 on shelves to maximize sales growth for the store 110. The planogram 148 meets this objective by combining the data 128 captured from the one or more sensors 114 in real-time or near real-time with the identifiable information from the repository 122. Furthermore, the planogram 148 is a store-based planogram that address the unique characteristics of the space (e.g., the store 110), and thus, provides better insights regarding performance of the store 110 and ways to increase revenue as compared to a paper planogram that is frequently used.

It should be appreciated that the planogram 148 may be used to solve both the issue of using CCTV to obtain foot traffic tracking and using CCTV to obtain information regarding missing products.

In some examples, the computing device 104 is further configured to: receive login credentials from a user 108 to access a website 116 associated with the store 110. The computing device 104 may query the repository 122 to determine an identity of the user 108 and an access level 154 to the website 116 for the user 108. The user 108 is a store manager 102, a store administrator 156, or a department sorter 158 of store 110. However, it should be appreciated that the user 108 may comprise another type of user not explicitly listed herein, such as a customer or patron that may be able to access one or more components of the system.

In general, the access level 154 is a first access level or a second access level. The second access level is greater than the first access level, and as such, the user 108 associated with the second access level can perform a greater number of actions with respect to the website 116 as compared to the first access level.

As shown in FIG. 2, the user 108 with the second access level may view, add, modify, or delete information via numerous engines on the website 116, such as: a dashboard engine 130, a planogram engine 132 (that creates the planogram 148), a product inventory engine 112, and/or a master data engine 134. The master data engine 134 includes information regarding departments 136 for the store 110, tags 138 for the store 110, display units 140 for the store 110, and/or floors 142 for the store 110. Further, the master data engine 134 allows the user 108 associated with the second access level to upload relevant data or information via an upload engine 144. As shown in FIG. 3, the product inventory engine 112 may include UPC barcodes associated with products of the product inventory 112, names associated with the products of the product inventory 112, and/or sources for the products of the product inventory 112, among other information not explicitly listed herein.

As another example, the user 108 with the second access level may engage the system to manage tasks of various types, such as counting daily carts (e.g., equipment of the equipment inventory 146). Each task performed is labeled and from that moment on, the tasks already exist in relation to schedules and execution, and thus, lessons can be learned from the execution.

Figure 5:
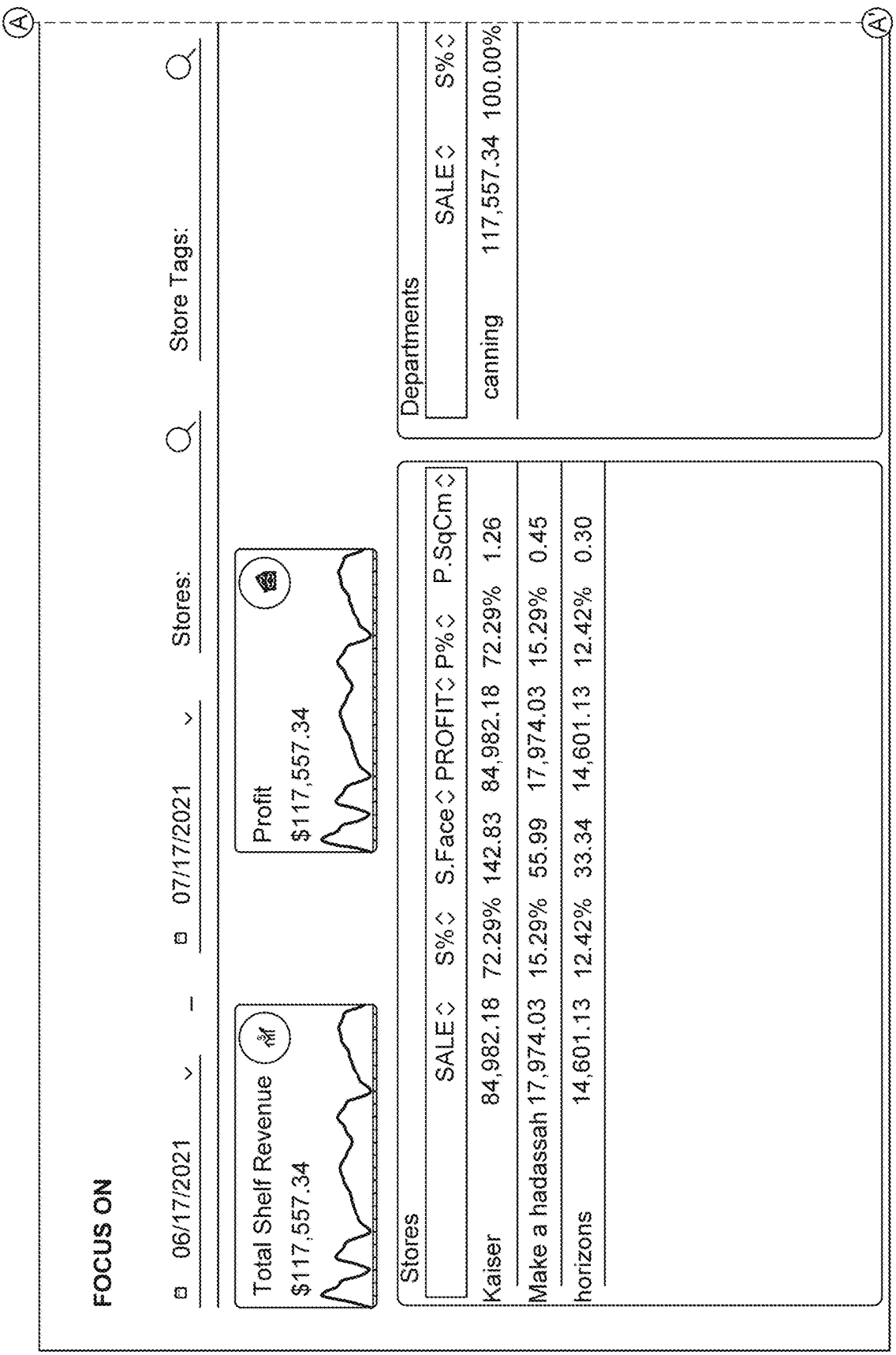
FIG. 5 depicts an image of store data viewable via a website of a system, according to at least some embodiments disclosed herein.
Figure 5:
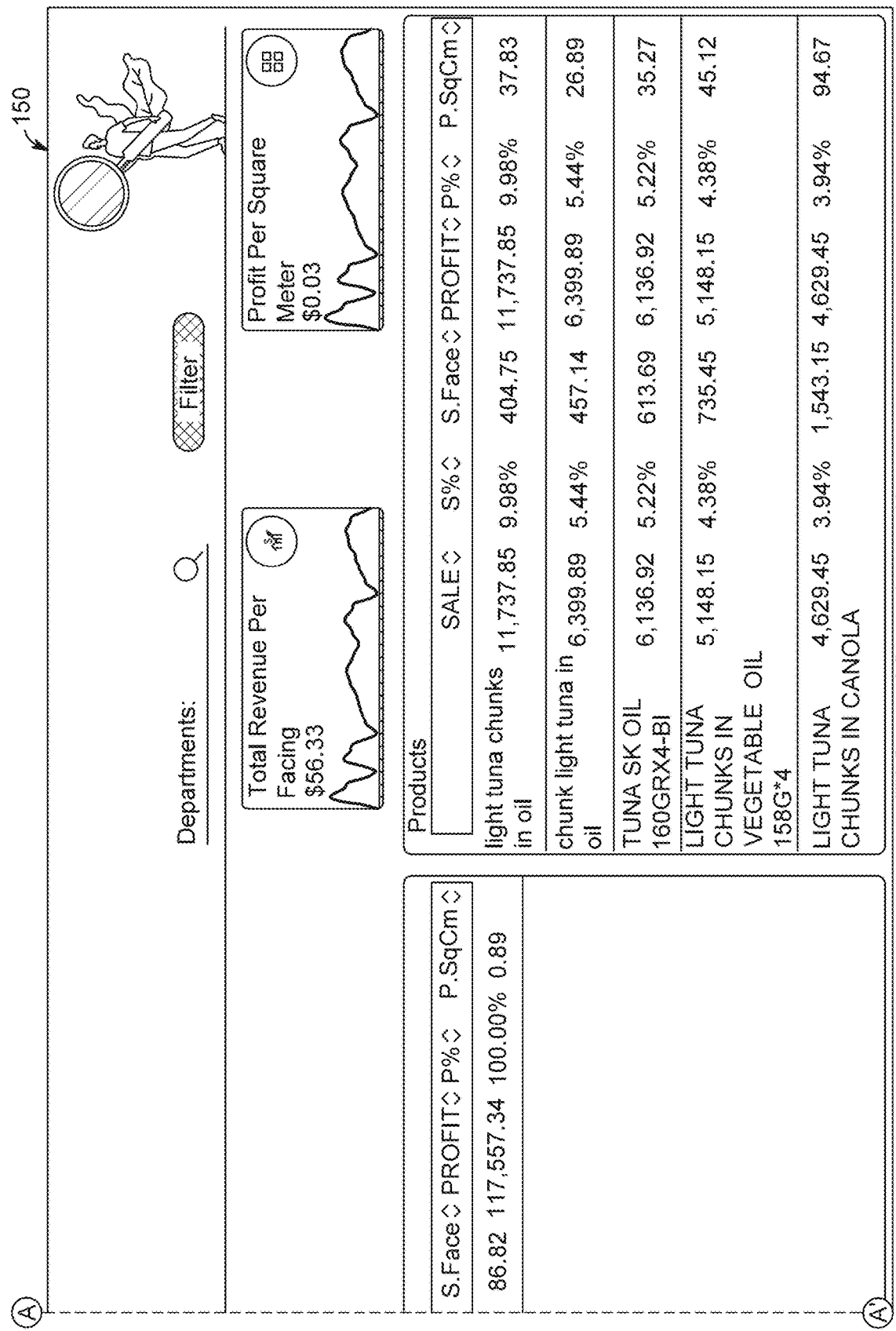

Further, the second access level allows the user 108 to provide feedback regarding the system. Additionally, as shown in FIG. 5, the second access level allows the user 108 to search 150 for and filter relevant information based on a time period, a specific store, a store tag, a department, etc., where such relevant information may include, but is not limited to: total shelf revenue, profit, total revenue per facing, profit per square meter, etc. In some examples, the information may be displayable per store, per department, or per product. It should be provided that these actions are provided for illustrative purposes only and other actions are allowable that are not explicitly listed herein.

As described, the user 108 may be the store manager 102, the store administrator 156, the department sorter 158, or a patron/customer of store 110. The system described herein is a backend system for the store manager 102 to re-organize a product inventory in real-time in the store 110 in such a way that maximizes profit of the products in the product inventory 112 by tracking the locations and placements of the products in the store 110 based on the store-specific planogram 148.

Figure 8:
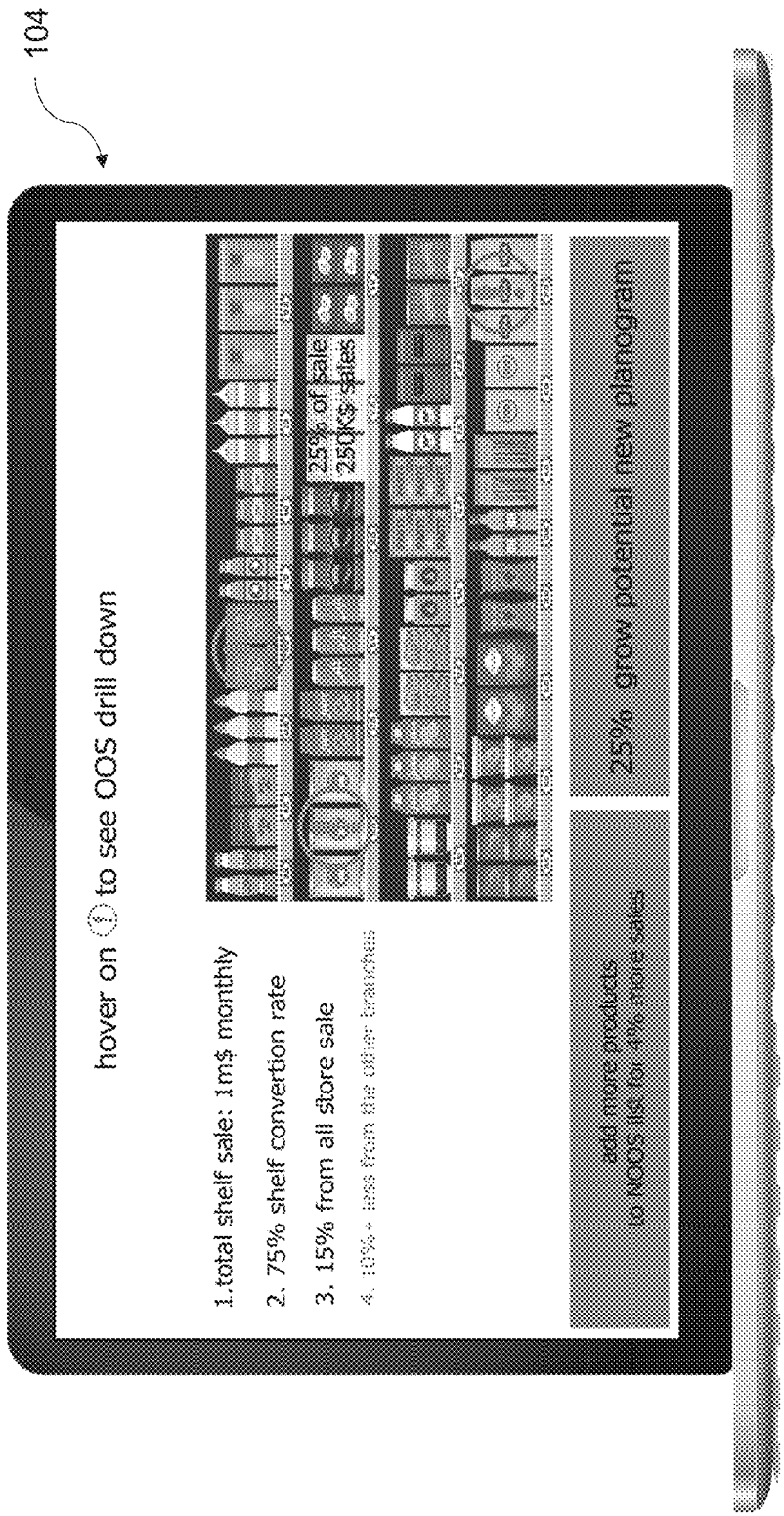
FIG. 8 depicts an image of product inventory and product location in a store viewable by a user via a website of a system on a computing device, according to at least some embodiments disclosed herein.

Based on the access level 154 as discussed, the store manager 102 may be granted access to: view all branch planograms, receive notification of changes from the stores, view relevant sales data, receive alerts regarding out of stock products, and/or receive alerts regarding products that cannot be out-of-stock and must be on the store shelf at all times, among others. The store manager 102 may also be granted access to view photographs of shelving in the stores (e.g., FIG. 8) and may be allowed to provide instructions for the employees 106 regarding where to focus their work in a specific store 110. Such instruction may include moving and/or placing the product inventory 112 based on buying trends.

Figure 6:
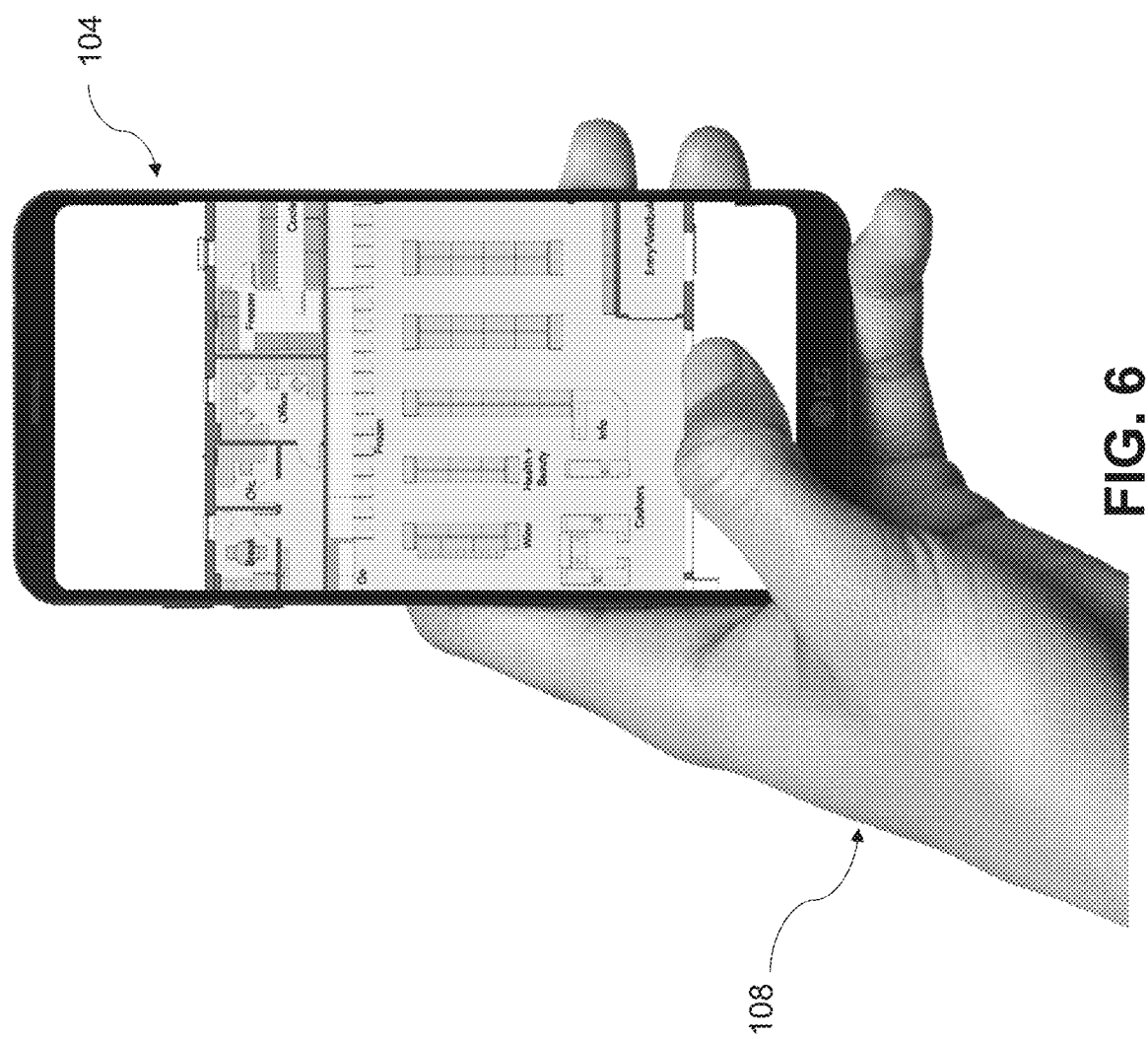
FIG. 6 depicts an image of a store layout viewable by a user via a website of a system on a computing device, according to at least some embodiments disclosed herein.
Figure 7:
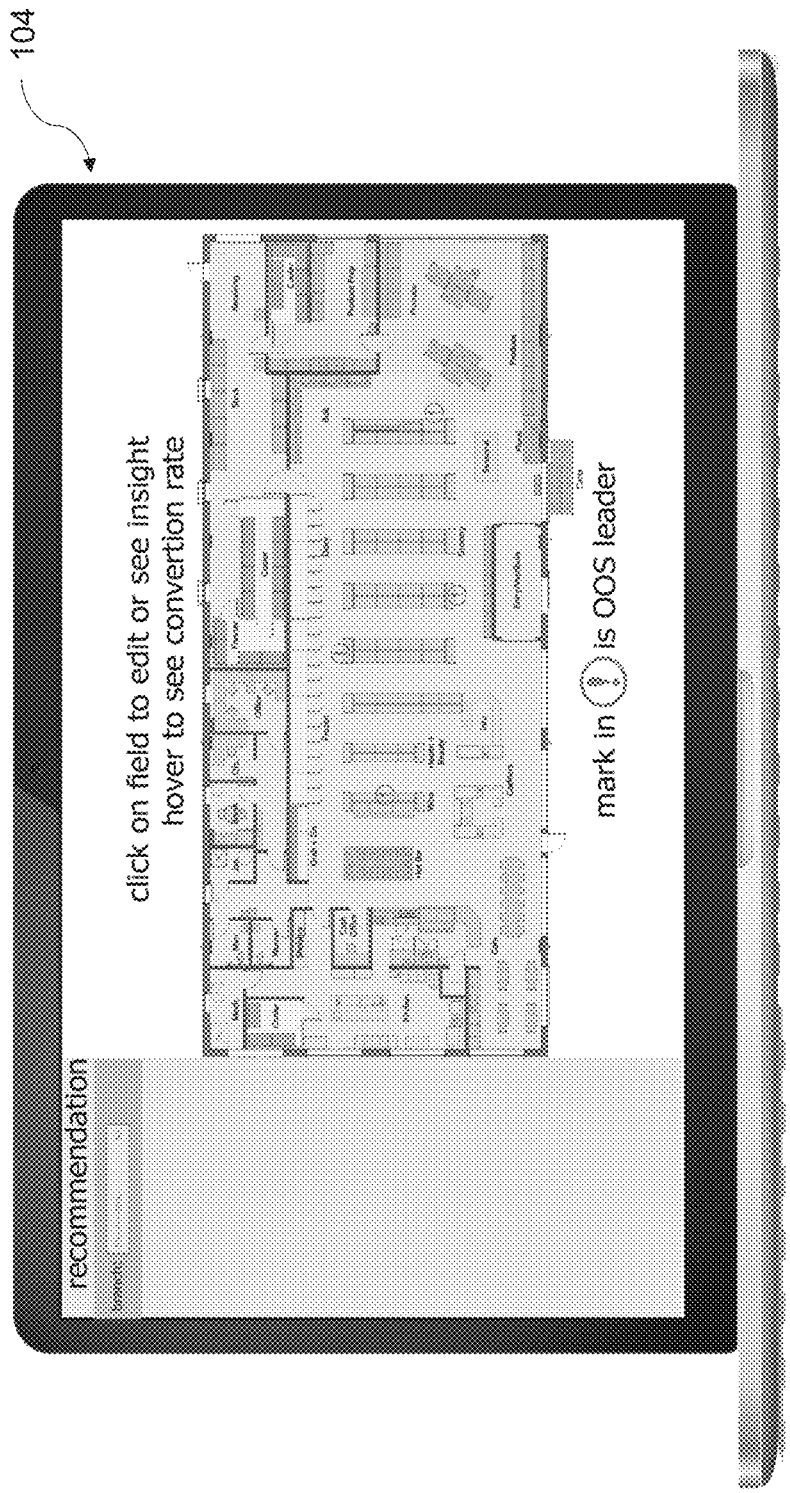
FIG. 7 depicts an image of a store layout viewable by a user via a website of a system on another computing device, according to at least some embodiments disclosed herein.

The store administrator 156 may be granted access to scan and upload information for all products of the product inventory 112 that cannot be out of stock and must be on the store shelf all the times, view store layouts (e.g., FIG. 6 and FIG. 7), build the planogram 148 with forecast and daily change alert, and/or make changes to various information discussed, among others. As another example, the planogram 148 may be used by the store administrator 156 to identify the length of time that the patrons 126 are in each department of the store 110 and thus actually understand what the sales potential is at each point in the store 110.

The department sorter 158 of store 110 may be granted access to place each product in its right place according to instructions from the store administrator 156, compare the planogram 148 and determine the layout for the store 110, create stock lists that need to be ordered or filled, alert relevant uses of out of stock products, and/or alert relevant uses of products that cannot be out-of-stock and must be on the store shelf at all times, among others.

In some examples, the application 118 executed on the computing device 104 provides a queue monitoring engine that detects, from the one or more sensors 114, an extension of queues and transmits a notification/warning regarding an expected extension of a queue in the store 110. The notification/warning may be graphical, textual, or visual and may be transmitted to the user 108 in any way known to those having ordinary skill in the art.

As described, the system of the present invention incorporates a method to generate and verify the store-specific planogram 148 with store analytics (e.g., location and quantity of for each product of the product inventory 112, for each piece of equipment of the equipment inventory 146, for each of the patrons 126, and/or for each employee of the employees 106 in the store 110) to pinpoint any weaknesses at the branch level and thus direct resources to growth in the relevant places for the store 110.

Furthermore, regarding the out of stock product inventory 112, gamification may be used to prompt sorters of the product inventory 112 to update a status of the product inventory 112 on the shelf at all times. In examples, the system is integrated with the POS. When the system tracks that a product arrives to certain level (e.g., +/−75%), the sorter receives a task to go and fill up the shelf again. Using this ability, ordering is made more efficient and stable. In additional examples, an e-commerce real-time tracker is used to track and expose an end user to an existing status of the shelf.

Computer System

Figure 9:
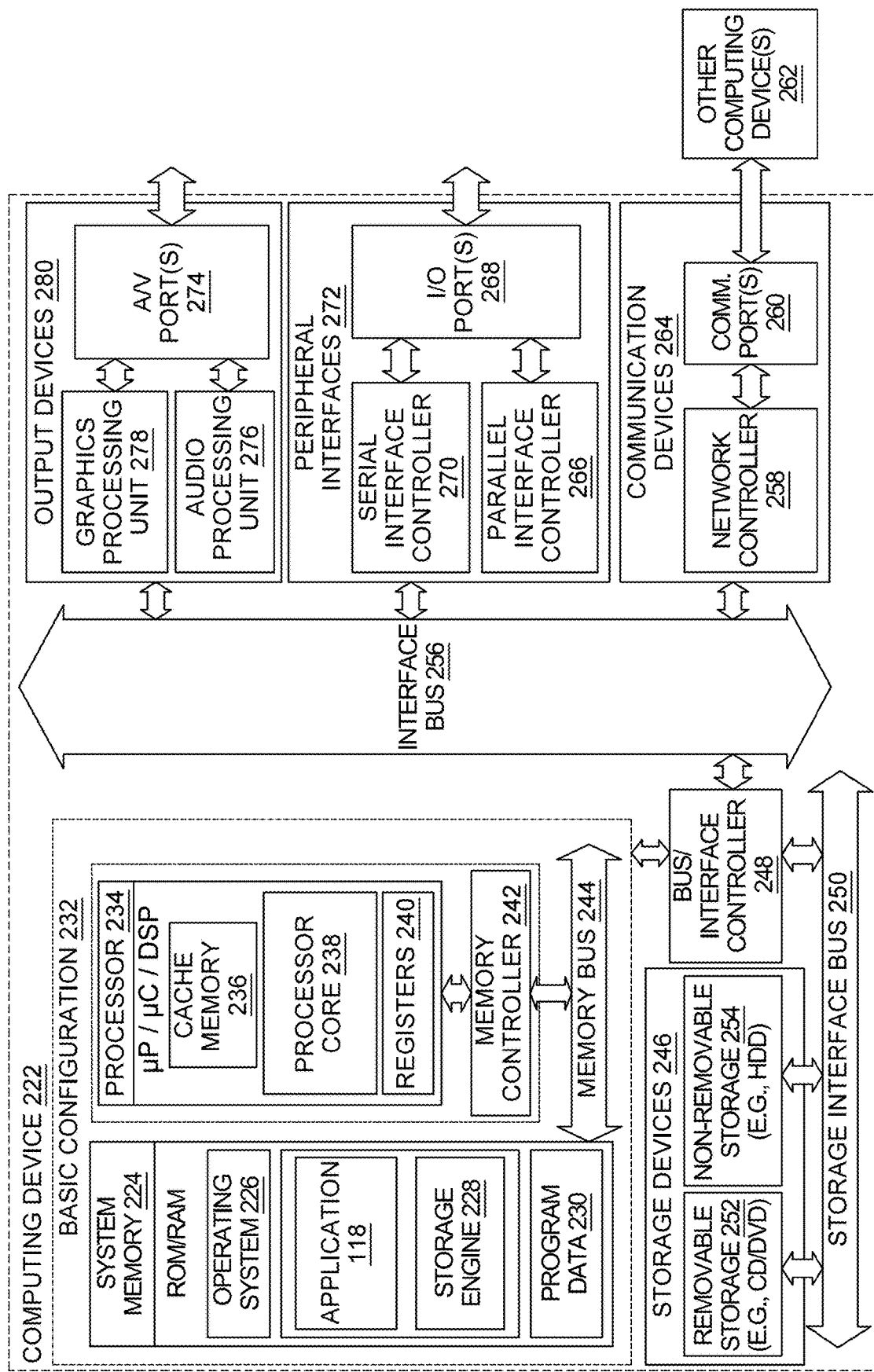
FIG. 9 depicts a block diagram of the computing device of FIG. 1 or FIG. 2, according to at least some embodiments disclosed herein.

In some embodiments, the present invention may be a computer system, a method, and/or the computing device 104 or the computing device 222 (of FIG. 9). For example, the computer system and/or the computing device 222 may be utilized to implement the method described herein.

A basic configuration 232 of a computing device 222 is illustrated in FIG. 9 by those components within the inner dashed line. In the basic configuration 232 of the computing device 222, the computing device 222 includes a processor 234 and a system memory 224. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (µP), a microcontroller (µC), and a digital signal processor (DSP), or any combination thereof. Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an operating system 226, one or more applications, such as the application 118, and program data 230. It should be appreciated that the one or more applications may alternatively be engines, software programs, services, or software platforms. Further, the system memory 224 also includes a storage engine 228 that may store any information disclosed herein.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

Another embodiment of the invention provides a method that performs the process steps on a subscription, advertising, and/or fee basis. That is, a service provider can offer to assist in the method steps described herein. In this case, the service provider can create, maintain, and/or support, etc. a computer infrastructure that performs the process steps. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein. When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method executed by an application of a computing device to provide insights regarding retail store performance and/or store layout, the method comprising:
   dividing a store into one or more zones;
   placing, one or more sensors in each of the one or more zones;
   receiving, from the one or more sensors in the store, real-time image data and associated sensor metadata associated with product inventory, equipment inventory, patrons, and employees in the one or more zones of the store;
generating a digital image from the received data and performing pixel-level semantic segmentation using a trained machine learning model to assign a class label to each pixel, wherein the labels distinguish patrons from employees, via the application, in the store to track a location of the patrons and the employees;
querying a repository to determine identifiable information associated with each of the product inventory, the equipment inventory, the patrons, and the employees;
combining the data with the identifiable information to form a data set;
executing a spatial analysis algorithm to compute layout-specific performance metrics from the structured multi-entity data set to determine a conclusion regarding a performance and/or layout of the store, the conclusion is based on an engagement rate per hour comprising:
at least a quantity of the pixel-labeled patrons in each zone of the one or more zones of the store; and
at least a quantity of the pixel-labeled employees in each of the one or more zones of the store;
storing the data, the data set, and the conclusion in the repository;
presenting a representation of the conclusion via a graphical user interface (GUI) to a user, wherein the representation is a store-specific planogram;
automatically generating and transmitting, via the application, a set of actionable reorganization instructions based on the conclusion to at least one device associated with one of the plurality of employees, wherein the actionable reorganization instructions specify updated product placements within the retail store to optimize the one or more layout-specific performance metrics; and
dynamically reorganizing by a store manager, the product inventory within the retail store based on the store-specific planogram and the actionable reorganization instructions, wherein the dynamic reorganization is configured to maximize a profit associated with the product inventory by tracking locations and placements of the product inventory within the retail store.

2. The method of claim 1, wherein the data associated with the product inventory, the equipment inventory, the patrons, and the employees in the store includes a location and a quantity of each product of the product inventory, each piece of equipment of the equipment inventory, each patron of the patrons, and each employee of the employees.

3. The method of claim 1, further comprising:
receiving login credentials from a user to access a website associated with the store; and
querying the repository to determine an identity of the user and an access level to the website for the user.

4. The method of claim 3, wherein the user is selected from the group consisting of: a manager of the store, a patron of the store, an administrator of the store, and a department sorter of the store.

5. The method of claim 3, wherein the access level is selected from the group consisting of:
a first access level and a second access level.

6. The method of claim 5, wherein the second access level is greater than the first access level.

7. The method of claim 6, wherein the second access level provides the user a larger number of actions with respect to the website as compared to the first access level.

8. The method of claim 6, wherein the second access level allows the user to provide feedback.

9. The method of claim 1, wherein the algorithm comprises an artificial intelligence (AI) algorithm.

10. The method of claim 1, wherein the conclusion is selected from the group consisting of: a quantity of missing products, a quantity of missing equipment, a quantity of the patrons in the store, a quantity of the patrons in the store per hour, a quantity of the patrons in each zone of the store, a quantity of the patrons in each zone of the store per hour, a quantity of the employees in the store, a quantity of the employees in the store per hour, a quantity of the employees in each zone of the store, a quantity of the employees in each zone of the store per hour, and an engagement rate per hour.

11. The method of claim 1, wherein the one or more sensors comprise one or more cameras.

12. A system for providing insights regarding retail store performance and/or store layout, the system comprising:
a store comprising one or more sensors configured to capture data associated with product inventory, equipment inventory, patrons, and employees in the store, wherein the data associated with the product inventory, the equipment inventory, the patrons, and the employees in the store includes a location and a quantity of each product of the product inventory, each piece of equipment of the equipment inventory, each patron of the patrons, and each employee of the employees;
a repository configured to store the captured data from the one or more sensors and identifiable information associated with each of the product inventory, the equipment inventory, the patrons, and the employees; and
a computing device comprising:
a graphical user interface (GUI); and
an application configured to:
divide a store into one or more zones;
place, one or more sensors in each of the one or more zones;
receive real-time image data and associated sensor metadata associated with the product inventory, the equipment inventory, the patrons, and the employees in the store from the one or more sensors;
generating a digital image from the received data and performing pixel-level semantic segmentation using a trained machine learning model to assign a class label to each pixel, wherein the labels distinguish patrons from employees, via the application, in the store to track a location of the patrons and the employees;
combine the captured data with the identifiable information;
executing a spatial analysis algorithm to compute layout-specific performance metrics from the structured multi-entity data set to determine a conclusion regarding a performance and/or a layout of the store;
the conclusion is based on an engagement rate per hour comprising:
at least a quantity of the pixel-labeled patrons in each zone of the one or more zones of the store; and
at least a quantity of the pixel-labeled employees in each of the one or more zones of the store;
transmit the conclusion to the repository for storage;
present a representation of the conclusion to a user, wherein the representation comprises a store-based planogram;

automatically generate and transmit, via the application, a set of actionable reorganization instructions based on the conclusion to at least one device associated with one of the plurality of employees, wherein the actionable reorganization instructions specify updated product placements within the retail store to optimize the one or more layout-specific performance metrics; and provide, via the graphical user interface, the store-specific planogram and the actionable reorganization instructions to a store manager, wherein the system is configured to enable the store manager to dynamically reorganize the product inventory within the retail store based on the store-specific planogram and the actionable reorganization instructions, such that the reorganization is directed to maximizing a profit associated with the product inventory by tracking locations and placements of the product inventory within the retail store.

13. The system of claim 12, wherein the computing device is further configured to: receive login credentials from the user to access a website associated with the store; and query the repository to determine an identity of the user and an access level to the website for the user, wherein user is selected from the group consisting of: a manager of the store, a patron of the store, an administrator of the store, and a department sorter of the store.

14. The system of claim 13, wherein the access level is selected from the group consisting of: a first access level and a second access level, and wherein since the second access level is greater than the first access level, the second access level provides the user a larger number of actions with respect to the website as compared to the first access level.

15. The system of claim 12, wherein the application further comprises a planogram management tool integrated into a sales floor of the store that allows the user to analyze and verify the store-based planogram.

16. The system of claim 12, wherein the application further comprises a queue monitoring system that is configured to detect an extension of queues and alert an expected extension of a queue.

17. The system of claim 12, wherein the conclusion is selected from the group consisting of:
a quantity of missing products, a quantity of missing equipment, a quantity of the patrons in the store, a quantity of the patrons in the store per hour, a quantity of the patrons in each zone of the store, a quantity of the patrons in each zone of the store per hour, a quantity of the employees in the store, a quantity of the employees in the store per hour, a quantity of the employees in each zone of the store, a quantity of the employees in each zone of the store per hour, and an engagement rate per hour.

18. The system of claim 12, wherein the one or more sensors comprise one or more cameras.

19. A computer system comprising one or more processors, one or more memories, and one or more computer-readable hardware storage devices, the one or more computer-readable hardware storage devices containing program code executable by the one or more processors via the one or more memories to implement a method to provide insights regarding retail store performance and/or store layout, the method, comprising:

receiving, from one or more cameras in a store, real-time image data and associated sensor metadata associated with product inventory, equipment inventory, patrons, and employees in the store, wherein the data associated with the product inventory, the equipment inventory, the patrons, and the employees in the store includes a location and a quantity of each product of the product inventory, each piece of equipment of the equipment inventory, each patron of the patrons, and each employee of the employees; generating a digital image from the received data and performing pixel-level semantic segmentation using a trained machine learning model to assign a class label to each pixel, wherein the labels distinguish patrons from employees, via the application, in the store to track a location of the patrons and the employees;

querying a repository to determine identifiable information associated with each of the product inventory, the equipment inventory, the patrons, and the employees;

combining the data with the identifiable information to form a data set;

executing a spatial analysis algorithm to compute layout-specific performance metrics from the structured multi-entity data set to determine a conclusion regarding a performance and/or layout of the store, wherein the conclusion is selected from the group consisting of: a quantity of missing products, a quantity of missing equipment, a quantity of the patrons in the store, a quantity of the patrons in the store per hour, a quantity of the patrons in each zone of the store, a quantity of the patrons in each zone of the store per hour, a quantity of the employees in the store, a quantity of the employees in the store per hour, a quantity of the employees in each zone of the store, a quantity of the employees in each zone of the store per hour, and an engagement rate per hour;

storing the data, the data set, and the conclusion in the repository;

presenting a representation of the conclusion via a graphical user interface (GUI) to a user, wherein the representation is a store-specific planogram;

automatically generate and transmit, via the application, a set of actionable reorganization instructions based on the conclusion to at least one device associated with one of the plurality of employees, wherein the actionable reorganization instructions specify updated product placements within the retail store to optimize the one or more layout-specific performance metrics; and provide, via the graphical user interface, the store-specific planogram and the actionable reorganization instructions to a store manager, wherein the system is configured to enable the store manager to dynamically reorganize the product inventory within the retail store based on the store-specific planogram and the actionable reorganization instructions, such that the reorganization is directed to maximizing a profit associated with the product inventory by tracking locations and placements of the product inventory within the retail store.

* * * * *